Feb. 23, 1943.  A. C. GASKILL, SR  2,311,823
FISHING ROD HOLDER
Filed Sept. 29, 1941
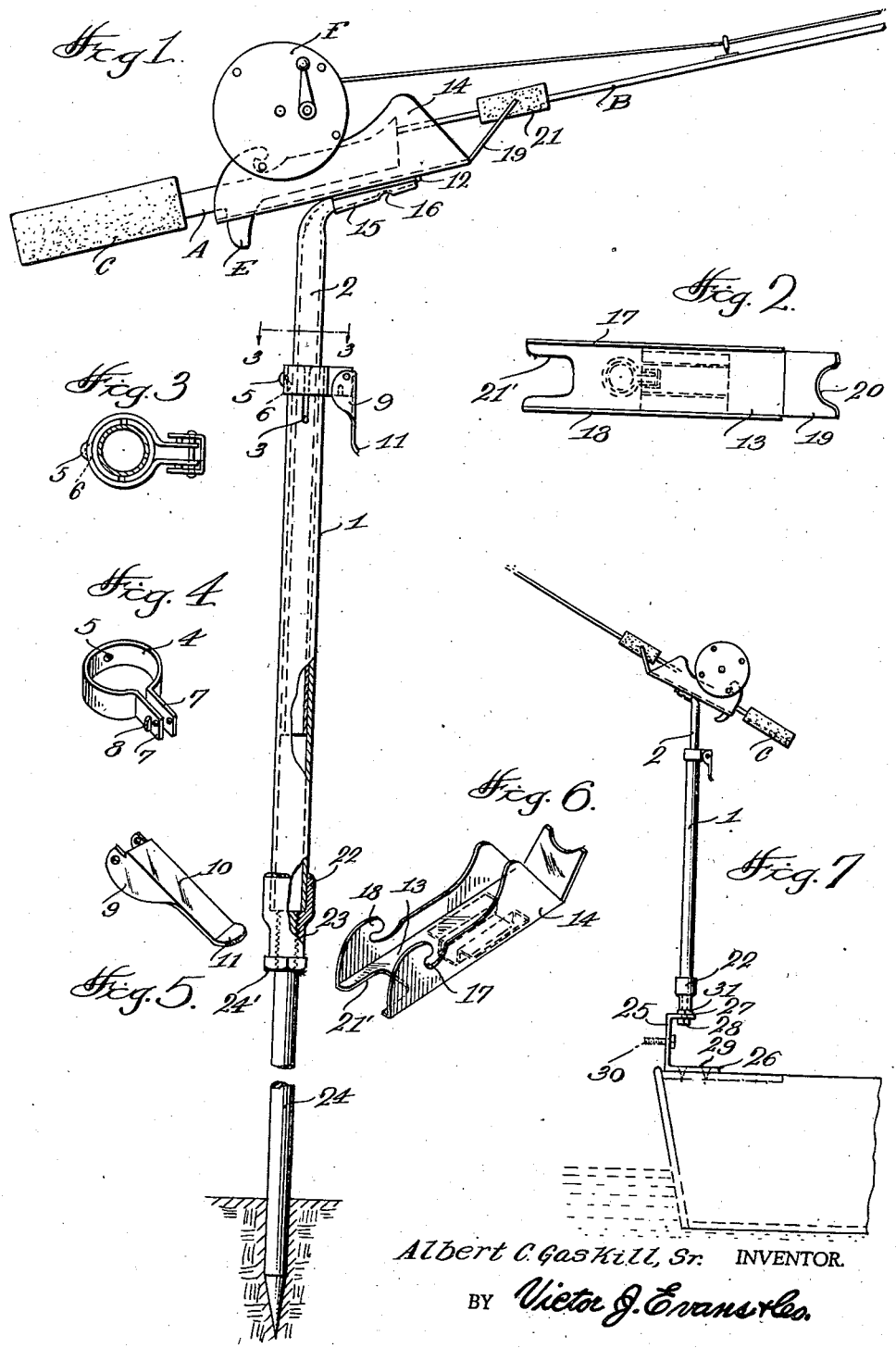
Albert C. Gaskill, Sr. INVENTOR.
BY Victor J. Evans & Co.

Patented Feb. 23, 1943

2,311,823

UNITED STATES PATENT OFFICE 2,311,823

FISHING ROD HOLDER

Albert C. Gaskill, Sr., Cheviot, Ohio

Application September 29, 1941, Serial No. 412,856

2 Claims. (Cl. 248—42)

This invention relates to fishing rod holders, and its general object is to provide a holder for supporting a reel equipped rod with respect to a bank of a body of water or with respect to a boat, while fishing, and to not only allow free turning of the reel, but to prevent casual removal or displacement of the rod and reel relative to the holder, yet the rod together with the reel can be readily removed, as well as applied in an easy and expeditious manner.

A further object is to provide a fishing rod holder that is readily adjustable as to height, as well as on a vertical axis, for carrying the rod accordingly, and the holder supports the rod at an inclined angle relative to the upright of the holder.

Another object is to provide a fishing rod holder that is simple in construction, inexpensive to manufacture, and extremely efficient in operation, use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a side elevation illustrating my holder in use, with the ground penetrating or anchoring attachment for fishing from the bank of a stream or other body of water.

Figure 2 is a top plan view of the rod and reel receiving and fastening member.

Figure 3 is a sectional view taken approximately on line 3—3 of Figure 1, looking in the direction of the arrows.

Figure 4 is a perspective view of the collar clamp for securing the adjustable or upper section of the holder in adjusted positions.

Figure 5 is a perspective view of the handle for locking the collar in clamped position.

Figure 6 is a perspective view of the rod and reel receiving and fastening member.

Figure 7 is a side view illustrating the holder in use, with the boat mounting bracket for fishing from a boat.

Referring to the drawing in detail, and particularly to Figure 1, it will be noted that my holder includes a sectional upright that is made up of an outer and lower section 1 and an inner and upper section 2, the latter being telescopically mounted in the section 1 for slidable and rotatable movement for adjustment relative to the section 1, as will be apparent upon inspection of Figure 1.

The lower section is provided with a pair of diametrically opposite slots 3 extending longitudinally thereof, for a portion of its length and from its upper end, so that the upper end portion of the lower section 1 can be contracted in gripping engagement with the upper section, for holding the latter in adjusted positions. For that purpose, I provide a clamping band 4 having an indentation 5 therein, centrally of its ends, for receiving an outwardly directed teat 6 formed on the lower section adjacent its upper end, to hold the band flush with the upper end of the lower section, as clearly shown in Figure 1.

The clamping band has formed therewith a pair of parallel tongues 7 having cam lugs 8 secured to the outer faces thereof and pivotally secured to the tongues 7 is a pair of ears 9 of a handle 10, the ears 9 providing jaws and are disposed upon the outer sides of the tongues 7 to bear against the cam lugs 8 when the handle is swung to the latched position of Figure 1, to force the tongues 7 toward each other and consequently the band is contracted in gripping engagement with the slotted upper end portion of the section 1 to cause the same to grip the upper section and thereby hold the latter against movement relative to the lower section, as will be apparent. The body of the handle is in the form of a strip and the outer end portion 11 thereof is outwardly flared to provide a finger piece.

The upper end portion of the section 2 is bent at an upward angle with respect to the remaining portion thereof and is flattened, as well as is tapered inwardly to its outer end, to provide a wedge like attaching arm 12 having an indentation in its under face, as best shown in Figure 1.

The rod and reel receiving and fastening means, as best shown in Figure 6, is preferably made from sheet metal or the like in channel formation, to provide a bottom wall 13, and side walls or flanges 14 formed on and rising from the longitudinal edges of the bottom wall, the latter being of substantially rectangular configuration and has an elongated socket member 15 fixed to its under face, the socket member having open ends and is shaped to fit the attaching arm 12 to set up a wedging action therewith. An inwardly directed teat 16 is provided in the bottom wall of the socket member 15 to be seated in the indentation of the arm 12, to prevent casual removal of the socket member from the arm, as will be apparent.

The bottom and side walls provide a pocket for receiving the forward portion of the handle A of the rod B, the handle A being provided with the usual grip C and is formed with an arcuate finger piece E forwardly of the grip, as shown in Figure 1. The reel is fixed to the handle A in the usual manner, and the side walls 14 are formed with arcuate slots 17 to provide forwardly directed hooks 18 for receiving a cross bar of the reel F as shown in Figure 1, to secure the handle within the pocket, with the side plates of the reel disposed on the outer sides of the side walls 14, so that my holder will in no way interfere with the rotation of the reel and the latter can be freely rotated by its handle, as will be apparent upon inspection of Figure 1. Formed on the forward end of the bottom wall 13 and extending at an upward and forward inclination therefrom is a supporting tongue 19 having a semicircular recess 20 therein to provide a seat for receiving the rod. I preferably provide a sleeve 21 of cushioning material, such as cork or rubber, and which is sleeved on the rod to be received in the recess. The rear end of the bottom wall is recessed as at 21' to provide a seat for the finger piece E.

By that construction, it will be obvious that the rod is supported at an upward inclination, against casual removal or displacement relative to the holder and as the upper section 2 is slidably and rotatably mounted in the lower section, the rod can be held at any desired height, as well as is adjustable in a horizontal plane. It will be further obvious that the rod can be applied and removed with respect to the holder in an easy and expeditious manner.

The holder is provided with a pair of attachments, one of which as shown in Figure 1 is for the purpose of securing the holder with respect to the bank of a body of water and the other in Figure 7 for securing the holder with respect to a boat. For securing these attachments relative to the lower section, the lower end of the latter has welded or otherwise fixed thereto a coupling collar 22 provided with an interiorly threaded reduced lower end 23. When the holder is used with respect to the bank of a body of water, a stake 24 having a threaded upper end is threadedly secured in the coupling collar 22, and the lower end portion of the stake is pointed for inserting the same in the ground. A lock nut 24' is threaded on the threaded upper end portion of the stake to bear against the collar 22, to prevent rotation thereof on the threads, as will be apparent.

The attachment of Figure 7 is in the form of a substantially U-shaped bracket 25 having a long arm 26 and a short arm 27, the latter being arranged uppermost as shown in Figure 7 and has a screw bolt 28 threaded therein for threadedly receiving the coupling collar 22 for supporting the holder relative to a seat or the like of a row boat. For that purpose, the long arm 26 has a pair of openings therein for receiving screws 29 for fixing the bracket to the seat. The bight portion of the bracket 25 may likewise have a screw bolt 30 threaded therethrough, for receiving the coupling collar 22, in the event it is desired or becomes necessary to secure the long arm to a side or rear wall of a boat or the like, as will be apparent upon inspection of Figure 7. A lock nut 31 may likewise be provided for this form.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A holder for fishing rods, comprising an upright having a lateral obliquely arranged upper end, a U-shaped channel rod receiving member having its bottom secured to the obliquely arranged upper end of the upright and of a width equal to the fishing rod and less than that of the reel, the rear ends of the side walls of the rod receiving member provided with arcuate slots forming outwardly extending hooks adapted to pass over the cross bar of a reel by a rearward sliding movement of the rod within the receiving member.

2. A holder for fishing rods, comprising an upright having a lateral obliquely arranged upper end, a U-shaped channel rod receiving member having its bottom secured to the obliquely arranged upper end of the upright and of a width equal to the fishing rod and less than that of the reel, the rear ends of the side walls of the rod receiving member provided with arcuate slots forming outwardly and downwardly extending hooks adapted to pass over the cross bar of a reel by a rearward sliding movement of the rod within the receiving member, the bottom of said member having at its outer end an obliquely extending rod engaging portion and the inner end of the bottom provided with a cut-away portion to receive the finger piece of a reel.

ALBERT C. GASKILL, Sr.